Figure 1:
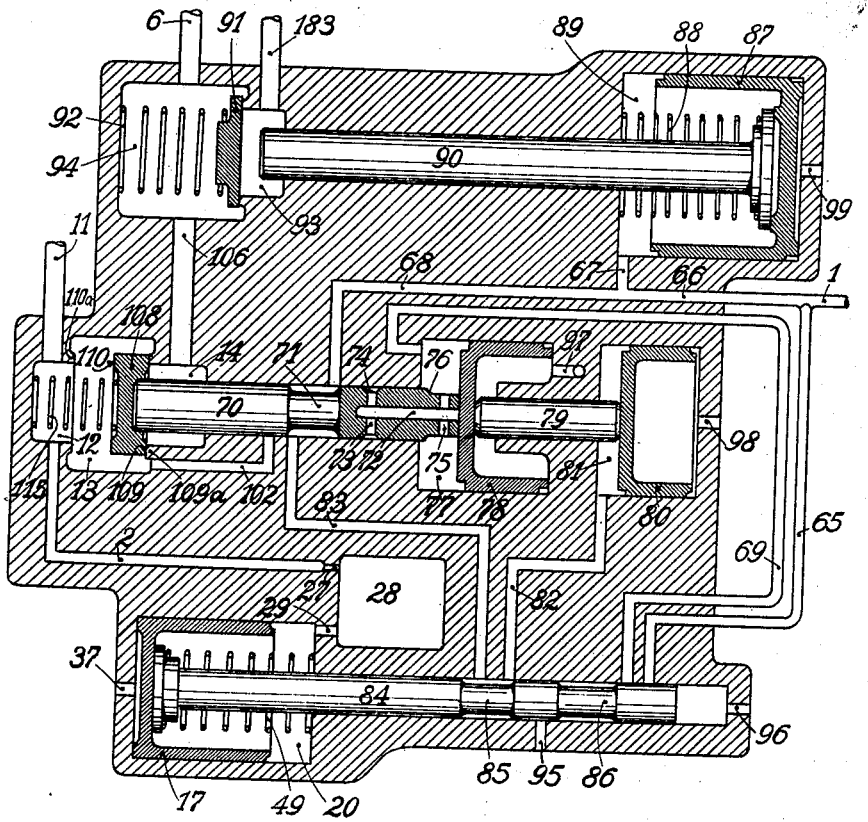

April 1, 1941.  K. MAYBACH ET AL  2,236,646

CONTROL MECHANISM FOR POWER OPERATED GEAR SHIFTING APPARATUS

Filed Oct. 30, 1937  2 Sheets-Sheet 1

Inventors
KARL MAYBACH, CARL BÖTTNER,
EUGEN GLÜCKER & GUSTAV MEYER

Edmund H. Parry
Attorney

Patented Apr. 1, 1941

2,236,646

UNITED STATES PATENT OFFICE 2,236,646

CONTROL MECHANISM FOR POWER OPERATED GEAR SHIFTING APPARATUS

Karl Maybach, Carl Böttner, Eugen Glücker and Gustav Meyer, Friedrichshafen, Bodensee, Germany, assignors to Maybach - Motorenbau G. m. b. H., Friedrichshafen, Bodensee, Germany Application October 30, 1937, Serial No. 172,020
In Germany October 31, 1936

23 Claims. (Cl. 137—139)

This invention relates to pressure operated gear shift mechanism, such as employed for shifting gears in motor vehicle transmissions, and is directed to an improved control device for controlling the supply of pressure medium to, and hence the operation of, the shift mechanism.

In its general design the invention involves a valve for cutting on and off the pressure medium to the shift mechanism which is actuatable in response to movement of an operating lever. The actuating lever may be one particularly designed for the purpose, or again may be either the clutch pedal or throttle lever of the motor vehicle. Preferably the arrangement of the control device is such that the control valve will be actuated upon movement of the operating lever in either direction so that pressure medium may be supplied to the gear shifting mechanism on forward movement and also backward movement of the lever.

The main feature of the invention involves the control of the operating pressure medium for the shift mechanism by a control member in the form of a double acting valve structure which in each of its end positions cuts off the supply of pressure medium to the shifting mechanism and which provides a flow of pressure medium when in an intermediate position between the two end positions. The device is so designed that upon movement of the operating lever in one direction the valve is first moved from one end position to an intermediate position to supply pressure medium for the shifting operation, and it is thereafter moved on to its other end position to cut off the pressure supply when the shift operation has been completed. On movement of the operating lever in the other direction the control valve can operate in the same way but in the reverse direction, moving from its second end position to an intermediate open position and thereafter from its open position to its original closed end position.

The invention may be embodied in a relatively simple and compact structure which is more efficient and reliable in operation than prior control devices. In the past difficulty has been experienced in automatic gear shifting devices by reason of failure of the operating mechanism to complete its shifting operation, because of the tendency of the shifting mechanism to effect too slow a shift, and also because of sticking of the pressure controlled valve or other operating parts of control devices. These difficulties are overcome by the present invention. Also, the inventive structure is so arranged that the danger of accidental leakage of the pressure medium and consequent inadvertent actuation of the shift mechanism is reduced to a minimum.

A further feature of the invention involves the provision of suitable actuating mechanism for the double acting valve so designed that a single movement of the operating lever will first produce movement of the valve to an intermediate open position from one of its end positions, and after pressure has been supplied to complete the shifting operation the valve will then be automatically caused to move on to its other end position. While the control valve remains open only momentarily, it should not close until sufficient operating pressure has been supplied. It is therefore proposed to provide mechanism which will hold the valve in its open position for a sufficient period. Such mechanism may advantageously be of the type forming the subject-matter of copending application Serial No. 172,019, filed Oct. 30, 1937, of Gustav Meyer, one of the present joint inventors, wherein the closing of the pressure supply control valve from open position is made dependent upon the pressure medium supplied to the shift mechanism. Through such arrangement the control valve will not close until sufficient pressure has been supplied to insure operation of the shift mechanism.

As a further specific feature of the invention, it is proposed to provide a pressure operated actuating mechanism for the control valve comprising a plurality of successively operating pressure-responsive actuators dependent on the operating lever, which effect the two-stage operation of the control valve as above referred to. The first actuator is moved by an initiating pressure under control of the operating lever to bring the valve from one end position to its intermediate open position, and thereafter such actuator can be held in its new position by the shifting pressure which operates the shift mechanism. The shifting pressure will preferably be transmitted to the actuator from the valve chamber. Arrangement can be made so that the shifting pressure may be effective on the actuator even though such pressure is cut off from the shift mechanism when the control valve is in one of its end positions. The latter arrangement enables the actuator to remain subject to the shifting pressure when the operating lever is depressed, whereas at the same time the shift mechanism receives no pressure medium and hence no loss of pressure is possible by reason of leaks through the shifting mechanism.

Figure 2:
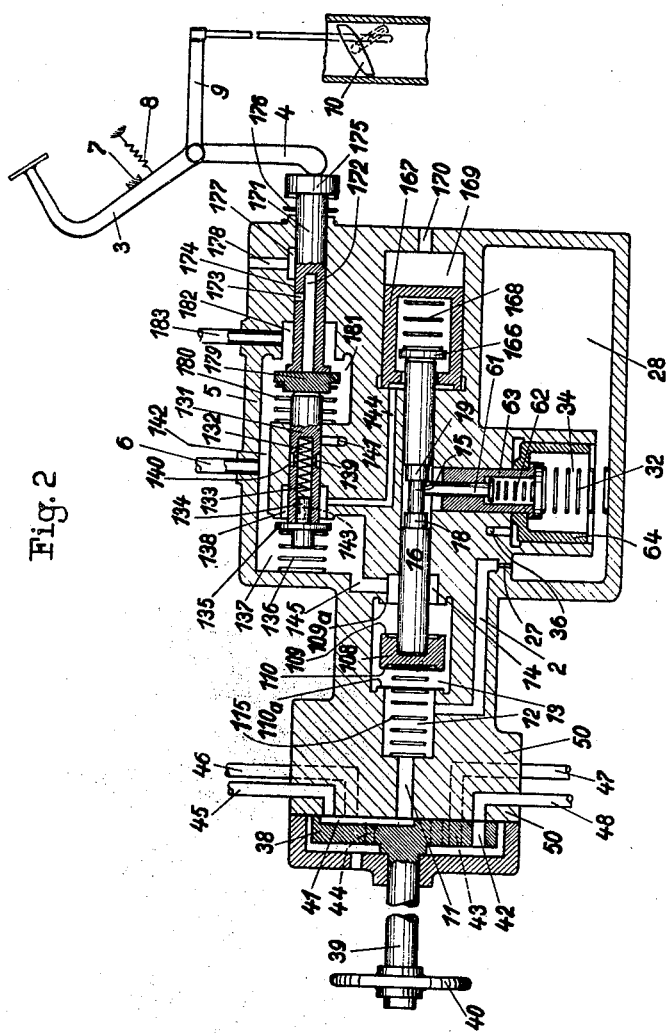

In Figures 1 and 2 two exemplary embodiments of the invention are illustrated in schematic arrangement and for the most part in section. Both of such arrangements are designed to utilize as the pressure medium a partial vacuum such as that produced in the intake manifold of the vehicle motor. It will be understood, however, that super-atmospheric pressure, such as compressed air, can also be used within the scope of the invention without any fundamental change.

In the embodiment of Figure 1, 108 is the double acting control valve, the same being housed in a chamber 13. In its right end position, face 109 of the valve engages valve seat 109a to close off a smaller chamber 14 from the valve chamber 13. In the left end position of the control valve, valve face 110 will engage valve seat 110a to close off the smaller chamber 12 from chamber 13. Pressure medium enters the device through line 6 and passes through chamber 94 and passage 106 to the right chamber 14. According to the present design where a partial vacuum is utilized as the pressure medium, the supply to which line 6 is connected may constitute the intake manifold, not shown, of the vehicle motor. When valve 108 is in open position the pressure medium from line 6 will be transmitted through chambers 14, 13 and 12 to conduit 11. The pressure responsive gear shifting mechanism and the pressure distributing valve mechanism for effecting selective operation thereof to produce different gear selections are well known in the art and have not been shown. It will be understood that conduit 11 supplies operating pressure thereto under control of valve 108.

Valve 108 is supported by a slide rod 70 and is normally held in its right end position by spring 115. The valve actuating mechanism includes piston 78 slidable in chamber 77 which acts against the right end of rod 70, and a second piston 80 in chamber 81 which through slide pin 79 serves to move piston 78, rod 70 and valve 108. It will be noted that chamber 81 is of less depth than chamber 77 so that piston 80 has a shorter stroke than piston 78. With this arrangement movement of piston 80 to its left end position causes piston 78 to move part way through its stroke and this in turn through rod 70 moves valve 108 away from seat 109a to its intermediate open position in chamber 13. Subsequent movement of piston 78 to its left end position will move valve 108 from its open position to its left end position against seat 110a.

Pressure for initiating the operation of pistons 80 and 78 is supplied through line 1. Line 1, like line 6, may supply a partial vacuum from the intake manifold, but it will be understood that, as in the embodiment of Figure 2, the supply of vacuum through and venting of line 1 will be subject to control by a valve actuatable by an operating lever (not shown). When the lever is moved in one direction vacuum pressure will be supplied through line 1, and upon movement of the lever in the other direction line 1 will be vented as in the case of more conventional types of pressure medium controls.

Line 1 has one branch comprising connecting passages 66, 68, 83 and 82 opening into chamber 81 of piston 80. Interposed between lines 68 and 83 is a slide valve 71 constituting a groove in slide rod 70 of the main control valve 108.

When valve 108 is in its right end position, pressure medium from line 68 is transmitted to line 83. When valve 108 is in either its intermediate open position or left end position, rod 70 has moved to the left to close valve 71. However, when rod 70 moves sufficiently to the left to bring valve 108 to its intermediate open position, valve 71 uncovers line 102 so that the shifting pressure transmitted to valve chamber 13 and line 11 from line 6 is also transmitted through line 102 to line 83. The same is true when valve 108 moves to its left end position.

The transmission of pressure medium from line 83 to line 82 and chamber 81 is controlled by a further valve 85 in slide rod 84. With valve 85 open as shown vacuum pressure will be supplied to chamber 81 from line 83. When rod 84 moves to the right line 83 will be cut off and chamber 81 in line 82 will be vented to the atmosphere through port 95.

There is a second branch of the initiating pressure line 1 comprising connecting conduits 65 and 69 opening into chamber 77 of the second piston 78. The supply of pressure medium from line 65 to 69 is controlled by a valve 86 in slide rod 84. When valve 85 which controls the supply to piston 80 is open as shown, valve 86 is closed and opens to supply pressure through line 69 to piston 78 only when rod 84 moves to the right to close valve 85 and cut off the supply of pressure to piston 80. However, an additional means is provided for supplying initiating pressure to chamber 77 of piston 78 through lines 66 and 68 of the first-mentioned branch of line 1. The right end portion of slide rod 70 is provided with a bore 72 communicating through a radial bore 75 in the reduced end portion 76 with chamber 77. At the other end of bore 72 is a second radial bore 73 communicating with an annular groove 74. In the position shown bore 72 is cut off from line 68, and the same will be true when rod 70 moves sufficiently to the left to bring valve 108 into its intermediate open position. However, when rod 70 moves to the extreme left to bring valve 108 to its left end position groove 74 will be brought into registry with line 68 and the initiating pressure from line 1 will be transmitted through bores 73, 72 and 75 to chamber 77 to hold piston 78 in its left end position.

As will now be understood slide rod 84 operates alternately to transmit pressure medium to pistons 80 and 78 through valves 85 and 86 formed therein. As previously indicated, the purpose of the two pistons 80 and 78 is to produce movement of the main control valve 108 from closed to open position in one stage, and from open to its second end position in another stage. The purpose of valves 85 and 86 is to effect the desired operation of the pistons to this end, and accordingly arrangement is made to actuate rod 84 to produce the desired sequence of operation of the respective pistons. In order that valve 108 after reaching its open position can be held therein for sufficient time to supply adequate shifting pressure from line 6 to line 11 to effect operation of the shift mechanism, actuating mechanism for rod 84 is provided such that after movement of piston 80 to its left end position by the transmission of pressure through line 83, valve 85 and line 82, there will be a time delay, although very small, before rod 84 is moved to the right to close valve 85 and open valve 86 to allow the transmission of pressure through line 69 to piston 78. The actuating mechanism for rod 84 in the present instance comprises a piston 17 slidable in a chamber 20 having at its left end a vent 37. Piston 17 and rod 84 are normally held in their left end position as shown by a spring 49. As in the copending application Serial No. 172,019, above referred to, the closing of valve 108 may be made responsive to the condition of the shifting pressure for the shift mechanism. Line 2 communicating with chamber 12 connects with a further chamber 28 which in turn communicates through port 29 with piston chamber 20. When valve 108 is in its intermediate open position, pressure from line 6 is transmitted through chambers 13 and 12 through the parts just described to act on piston 17 at the same time pressure is supplied to the shift mechanism through line 11. However, in line 2 is provided a restricted port 27 which, together with the enlargement provided by chamber 28, will delay the transmission of sufficient pressure to chamber 20 to effect movement of piston 17 to the right until adequate pressure has been supplied through line 11 to produce a shift operation. In the event the pressure supply through line 6 is temporarily inadequate to effect operation of the shift mechanism piston 17 will remain in its left end position until such condition has been overcome. Upon movement of piston 17 to the right to close valve 85 and open valve 86 pressure medium will be supplied to piston 78 which will thereupon move to the left to bring valve 108 against its left seat 110a, cutting off the supply of pressure to line 2 as well as line 11.

The various parts of the control device in Figure 1 are in the positions they occupy when no shifting operation occurs, the operating lever to which the control device is responsive being in an inoperative position. As before stated the operating lever may be of a type which will produce a pressure impulse in line 1, either when the lever is moved in both directions or only in a single direction. In any event when the lever is moved to an operative position to initiate a gear shifting operation of the shift mechanism, the pressure medium, here partial vacuum, is transmitted to chamber 81 through lines 66, 68, 83 and 82 since both valves 71 and 85 are open. Piston 80 is moved through its complete stroke to its left end position and operates through rod 70 to move the main control valve 108 to its intermediate open position. The shifting pressure supplied through lines 6 and 106 to chamber 14 then passes through chamber 13 into chamber 12 and is supplied through line 11 to the shifting mechanism. Pressure is simultaneously transmitted from chamber 12 through line 2, chamber 28 and port 29 to chamber 20. In moving valve 108 to its intermediate position line 68 is cut off so that the initiating pressure transmitted from line 1 is no longer supplied to piston 80, but at the same time valve 71 establishes communication between lines 102 and 83 so that shifting pressure from line 6 in chamber 13 is transmitted through lines 83 and 82 to hold piston 80 in its left end position. Valve 108 remains open until sufficient vacuum has been established in chamber 20 to move piston 17 to the right against the action of its spring 49. Thereupon valve 85 closes and valve 86 opens. Initiating pressure from line 1 is then transmitted to lines 65 and 69 to chamber 77, and accordingly piston 78 is moved to its left end position to shift valve 108 against its left end seat 110a. Shifting pressure which still exists in chamber 13 is thus cut off from chamber 12, line 11 and from chamber 20. Through leakage around piston 17 through port 37 the vacuum existing in chamber 20 dissipates quite rapidly and thereupon piston 17 and rod 84 move back to the left under action of spring 49. Through such movement initiating pressure transmitted to piston 78 through lines 65 and 69 is cut off. However, when piston 78 reaches its left end position initiating pressure is transmitted thereto through line 68 and bores 73, 72 and 75. Such initiating pressure serves to hold piston 78 and control valve 108 in their left end positions. It will be understood that piston 78 closes valve 108 only after the shifting operation has been completed by the shift mechanism since, as before explained, rod 84 does not move to supply initiating pressure to piston 78 until sufficient time has elapsed to allow the transmission of adequate operating pressure through line 11, piston 17 which actuates rod 84 being dependent on the same shifting pressure itself as operates the gear shift mechanism.

Assuming now the operating lever is moved to vent line 1, as when the vehicle is ready to be driven in the gear selection which has now been set, the vacuum which has been acting on piston 78 is vented through bores 75, 72, 74 and lines 68, 66 and 1. Piston 78 then moves part way to the right to allow valve 108 through the action of its spring 115 to be moved from its left end position to its intermediate open position. Piston 80 is still held in its left end position by the shifting pressure transmitted from chamber 13 through line 102, since after valve 108 reached its left end position leakage around piston 17 allowed rod 84 to move to the left to reestablish communication between lines 102, 83 and 82. Hence, valve 108 is stopped in its intermediate open position as soon as piston 78 reaches pin 79.

With valve 108 again open, shifting pressure is again transmitted through line 11, and if for any reason the shifting operation had not been completed when valve 108 was previously open during movement from right to left the shifting operation can now be completed. While valve 108 is in its intermediate position, pressure is again transmitted through line 2 to chamber 20. When sufficient pressure has been developed piston 17 again moves to the right, closing valve 85 so as to cut off transmission of shifting pressure from chamber 13 to piston 80 and at the same time uncovering port 95 so that through the latter lines 82 and chamber 81 are vented. Thereupon piston 80 moves to its right end position to allow valve 108 to be forced against its right end seat by its spring 114. Chamber 13 is thereby cut off from chamber 14 and line 6 and the transmission of such pressure to lines 11 and 2 is discontinued. Piston 17 will thereupon move back to its left end position to open valve 85 and close valve 86 preparatory to a new shifting operation when the operating lever is again moved to establish a vacuum in line 1 and the several branches thereof. It will be noted that vents 97 and 98 communicate with the right hand portions of chambers 77 and 81 so that pistons 78 and 80 can be moved rapidly to the right under the action of spring 115.

In the event the vehicle is equipped with an automatic clutch mechanism as well as automatic gear shift mechanism, the clutch control may, as shown in Figure 1, be incorporated in the same unit with the gear shift mechanism control as hereabove described. In chamber 94, in the upper portion of the unit through which shifting pressure from line 6 is transmitted to the gear shift mechanism control valve 108, is a valve 91 normally held in engagement with a seat at the right end of chamber 94 by spring 92. To the right of the valve is a smaller chamber 93 from which extends a line 183 adapted to supply operating pressure from line 6 to pressure operated mechanism for the vehicle clutch. A slide rod 90 actuatable by piston 87 and chamber 89 against the action of spring 88 serves to open valve 91 when moved to the left. Chamber 89 at its right end is provided with a vent 99 and at its left end is connected by line 67 with branch line 66 of the main initiating pressure line 1 controlled by the operating lever. With such arrangement, as soon as the lever is operated to establish a partial vacuum in line 1, piston 87 is moved to the left to transmit pressure from line 6 to line 183. This will occur at the same time that the initiating pressure is transmitted to piston 89 to effect opening of control valve 108. Similarly, after the gear shifting operation has been completed and the operating lever is moved to vent line 1, the vacuum is released from chamber 89 and piston 87 moves to the right to close valve 91. Accordingly, the transmission from line 6 to line 183 is cut off.

The operation of the control device as above described has been made on the assumption that the operating lever has been moved from its rest position and held depressed until the control valve 108 has moved from its right end position to its open position and then to its left end position, and that thereafter the operating lever has been moved in the other direction to its original position to cause valve 108 to move from its left to its open position and then to its original right end position. Under such operation of the lever a shift operation may be initiated in both directions of its movement, and during traverse of valve 108 from right to left, and, again, from left to right. If, however, after the operating lever has been depressed initially to supply pressure from line 1 to piston 80 and cause valve 108 to open, the operating lever is quickly returned to its rest position before sufficient pressure has been built up in chamber 20 to cause valve 86 to open and before the shift operation has been completed the further action of valve 108 will be different than before. As soon as piston 80 moves to its left end position under the initiating pressure from line 1 and valve 108 has moved to open position, the venting of line 1 by the release of the lever will not affect piston 80 since as soon as the valve opens the piston is held in its left end position by shifting pressure transmitted through line 102. Therefore, despite the venting of line 1, pressure will gradually build up in chamber 20 to cause rod 84 to move to the right. Since line 1 is vented no operating pressure will then be transmitted through line 69 and piston 78 will remain inoperative. Valve 108 will therefore not be moved on from its open position to its left end position. On the other hand, movement of rod 84 to the right under the action of piston 17 will connect line 82 with port 95 through valve 85. Piston 80 will thereupon move from its left to its right end position and allow valve 108 to move from its open position back to its right end seat.

In the embodiment of Figure 2 the actuating means for the double acting valve and the means for holding the same in its intermediate open position are somewhat different than in Figure 1 although causing the control valve to operate in the same manner. Also, certain additional parts are shown in Figure 2, not found in Figure 1, including an exemplary pressure distributing mechanism through which the gear shift mechanism is selectively operated to produce different gear shift selections, and including one form of operating lever through the action of which movement of the control valve is initiated.

In Figure 2 the shifting pressure control valve 108, together with its associated chambers 12, 13 and 14, valve faces 109 and 110, valve seats 109a and 110a, and spring 115, is as before. The shifting pressure supplied from the intake manifold of the engine through line 6 enters chamber 137 in the upper portion 5 of the unit and is transmitted from such chamber through angular passage 145 to chamber 14 at the right of valve 108. In this case line 6 also supplies initiating pressure for actuating valve 108. Located in chamber 137 is a valve 135 which in its right position closes a small chamber 138 through the action of spring 136. Valve 135 has a stem 134 supported in bore 132 of a slide rod 131. The operating lever is shown at 3 and is here indicated as constituting the gas pedal of the vehicle operating through arm 9 to actuate the gas throttle 10. Lever 3 is normally held in its rest position against stop 7 by a spring 8. A second arm 4 of lever 3 acts against head 175 of slide rod 171. Spring 176 acts against head 175 and tends to press rod 171 to the right. However, spring 176 is not sufficient to overcome the tension of spring 8 so that in the rest position of lever 3 rod 171 is held in its left position as shown in the drawings and acts through slide rod 131 to hold valve 135 open. Under such conditions pressure from line 6 passes through chamber 137 to chamber 138 and thence through line 144 to the actuating mechanism of the control valve 108 hereafter to be described.

When operating lever 3 is depressed slide rods 171 and 131 are moved to the right, causing valve 135 to close under the action of its spring 136. After valve 135 is seated spring 133 causes rod 131 to continue to move to the right until after lever 3 has been depressed slightly. An angular bore 143 at the left end of rod 131 is uncovered by movement of rod 131 to the right relative to the now stationary stem 134 of valve 135. In the same movement a radial bore 139 connecting with a groove 140 is brought in registry with a vent 141. The operating pressure, here partial vacuum, previously existing in line 144 and chamber 138 is thereby dissipated through bores 143, 132, 139 and vent 141.

The pressure responsive means for actuating valve 108 comprises a slide rod 16, the right hand portion of which extends into an actuating piston 167 disposed in chamber 169. A disc 166 is held in engagement with the end of rod 16 by a spring 168. A vent 170 communicates with the right end of chamber 169. Line 144 which supplies a partial vacuum under control of valve 135 and lever 3 connects with the left end of the chamber. The transmission of vacuum through line 144 moves piston 167 to its left end position as shown and through rod 16 urges valve 108 towards its left seat. When the vacuum in line 144 is released spring 115 tends to move valve 108, rod 16 and piston 167 towards their right end positions.

As before, means is provided to temporarily maintain valve 108 in its intermediate open position until sufficient shifting pressure has been supplied to actuate the gear shift mechanism.

Because in the present embodiment only a single actuating piston is used in connection with valve 108, a locking mechanism is employed which during traverse of the valve in either direction between its respective seats 109a and 110a automatically stops and locks valve 108 in its intermediate open position and automatically thereafter releases the same to complete its traverse to its second end position. Such mechanism comprises a latch 61 supported by a spring 62 in groove 63 of a piston 64. Piston 64 is supported by suitable guide means in chamber 28 and is pressed upwardly by a spring 32 housed in its hollow underside 34. A vent 36 communicates with the space at the upper end of the piston.

In rod 16 is a groove 15 on each side of which are shallower grooves 18 and 19. When valve 108 is in its end positions latch 61 engages one or the other of grooves 18 and 19. When valve 108 moves from one end position towards the other latch 61 through the action of springs 62 and 32 drops into groove 15, preventing rod 16 from completing its traverse and holding valve 108 in its intermediate open position.

Shifting pressure transmitted from line 6 to chamber 13, when valve 108 is in its intermediate open position, is transmitted from chamber 12 through line 2 and restricted orifice 27 to chamber 28. When a sufficient vacuum has been established in chamber 28 piston 64 is moved downwardly to release latch 31 from groove 15, thus allowing rod 16 and valve 108 to continue their movement to one or the other of their end positions.

Operating pressure from line 6 under control of valve 108 is transmitted through chamber 12 to line 11 which, as shown, communicates with a gear selecting mechanism comprising a distributor disc 38 at the left portion 50 of the control unit. The distributor disc is rotatable through a shaft 39 through a wheel or similar actuating member 40. Two pairs of conduits 45, 46 and 47, 48 will lead to the respective gear shifting motors. In disc 38 are a series of ports 43 and 44 which selectively vent one of each of the pairs of lines to the atmosphere, while the other lines of the respective pairs through suitable recesses 41 in the underside of the disc transmit vacuum received through line 11. By rotation of the disc 38 the conditions in the lines of each pair can be reversed so that different gear selections can be effected under operation of the gear shift motors.

Assuming that the operating lever 3 is depressed, rods 172 and 131 will have moved to the right and valve 135 will be closed. Line 144 will be vented through port 143, bores 132 and 139, and port 141. Piston 167 will be in its right end position, latch 61 will engage groove 18 and valve 108 will engage its right end seat 109a so that vacuum pressure from line 6 will be closed off from chamber 13. Operating pressure will then not be supplied to line 11 and the distributor mechanism. If now operating lever 3 be brought back to its rest position against stop 7, rods 171 and 131 will move to the left to open valve 135. During such movement port 143 will be closed by the stem 134 of valve 135 and bore 139 will be thrown out of registry with vent 141. The position of these and the other parts will then be as shown in the drawings. With the opening of valve 135 vacuum from line 6 will be transmitted through chamber 138 and line 144, moving piston 167 to its left end position. During such movement the piston rod 16 has been urged to the left to bring valve 108 to its intermediate open position. When rod 16 has moved part way to the left latch 61 drops into groove 15 and temporarily locks rod 16 against further movement, thus holding valve 108 in its open position. Piston 167, however, continues to move to its left end position through the lost motion connection provided between the piston and rod 16 by spring 168.

The opening of valve 108 not only transmits operating pressure to line 11 for the shifting mechanism but also through line 2 establishes a vacuum in chamber 28. The restricted orifice 27 delays the establishing of sufficient vacuum in chamber 28 to depress piston 64 until after the shifting operation has been completed. When sufficient vacuum has been established piston 64 moves downwardly, releasing latch 61 from groove 15, and allowing rod 16 to move to the left under expansion of spring 168 in piston 167. Thereupon, valve 108 is brought into engagement with its left end seat 110a. Vacuum is then cut off from chamber 12 and both lines 2 and 11. The vacuum existing in chamber 28 is gradually dissipated by leakage of air into the chamber from port 36 around piston 64. The piston again moves upwardly under the action of its spring 32 so that the latch 61 bears against groove 19 so as to be ready to again drop into groove 15 when rod 16 moves to the right.

As long as lever 3 remains in its rest position, valve 135 is open and pressure from line 6 acts on piston 167 so as to maintain valve 108 in engagement with its left end seat. If the lever be depressed in giving gas to the motor, valve 135 is immediately closed, line 144 is again vented to the atmosphere through port 141, and valve 108, rod 16 and piston 167 move towards the right under action of spring 115 until latch 61 drops into groove 15. Through the action of the latch rod 16 will be stopped with valve 108 in its intermediate open position. Operating pressure from line 6 is again transmitted through chamber 12 to line 11. At the same time vacuum is transmitted through line 2 to chamber 28. As soon as sufficient vacuum has been established in the latter chamber, piston 64 will move downwardly to release the latch from groove 15, whereupon rod 16 and piston 167 will move to their right end positions, bringing valve 108 against its right end seat 109a. The operating cycle is now complete and pressure from line 6 is again cut off from line 11 to the gear shifting mechanism. As before, pressure is similarly cut off from line 2, so that piston 64 moves upwardly with latch 61 now bearing against groove 18 in rod 16.

In Figure 2 a control has again been incorporated in the control unit for the vehicle clutch, the same being somewhat different in form from the corresponding mechanism in Figure 1. In the upper right hand portion 5 of the unit is located a chamber 181 communicating with the operating pressure supply line 6. In such chamber is located a valve 179 interposed between the adjoining ends of slide rods 176 and 131. Such valve is urged to the right by a spring 180, and in its right end position closes off a smaller chamber 182 from chamber 181. Line 183 from chamber 182 will supply operating pressure to the clutch actuating mechanism. In the left hand portion of slide rod 171 is a central bore 172 from which extends a radial bore 173. Disposed in the housing is a vent 178 communicating at its inner end with a groove 177. When rod 171 moves to the right upon depression of lever 3 and closes valve 179 the left end of rod 171 will be released from engagement with valve 179. The vacuum previously existing in line 183 and chamber 182 will then be dissipated through vent 178, groove 177 and bores 173 and 172. The venting of line 183 will cause the clutch servo mechanism to cause the clutch to engage. When the lever 3 is released the venting means just described is rendered inoperative and vacuum from line 6 is again transmitted upon the opening of valve 179 to line 183 to cause the clutch to disengage. At the same time valve 179 is opened by release of lever 3, valve 135 opens to supply operating pressure to piston 167 and initiate opening of control valve 108 to start the shifting cycle of the gear shift mechanism.

It will be understood from the several embodiments of the invention herein illustrated and described that the control valve 108 has two end positions in which operating pressure for the gear shift mechanism is cut off, and that during movement from either of said positions to the other position operating pressure is momentarily transmitted to the shift mechanism. Valve 108 is held in its intermediate open position for sufficient time to allow for the transmission of adequate pressure to operate the shift mechanism and then closes. Preferably, and as illustrated, the closing of the valve is made dependent upon the shifting pressure itself so that the valve will not close too quickly. As will be evident from a comparison of Figures 1 and 2, the actuating mechanism for the valve and also the means for holding the same in its intermediate open position are capable of a considerable range of modification and equivalency. Again, it will be evident that while both embodiments herein described are designed to utilize partial vacuum as the operating medium, the invention is equally applicable for use with a high pressure supply without any fundamental unobvious change. As previously indicated also, the arrangement of the double acting valve and its actuating mechanism is such that a gear shifting operation may be initiated through an operating lever when the lever is moved in either one or both of two directions.

We claim:

1. A control device for pressure-operated gear shifting mechanism in motor vehicles including a double acting valve for controlling the supply of shifting pressure to the shifting mechanism operative in each of its end positions to shut off the shifting pressure and operative in an intermediate open position to supply shifting pressure, an operating lever having two operating positions, lever operated actuated means for moving the double acting valve providing an interrupted movement of the valve responsive to any movement of said lever from one operating position to the other operating position from one closed end position to intermediate open position and then from intermediate open position to the other closed end position.

2. A control device for pressure-operated gear shifting mechanism in motor vehicles including a double acting valve for controlling the supply of shifting pressure to the shifting mechanism operative in each of its end positions to shut off the shifting pressure and operative in an intermediate open position to supply shifting pressure, manual control means, motor means for the double acting valve responsive to the manual control means to move the valve from a closed end position to intermediate open position and then becoming automatically operative independently of the manual control means to move the valve from intermediate open position to a closed end position.

3. A control device for pressure-operated gear shifting mechanism in motor vehicles including a double acting valve for controlling the supply of shifting pressure to the shifting mechanism operative in each of its end positions to shut off the shifting pressure and operative in an intermediate open position to supply shifting pressure, an operating lever having two operating positions, reversely acting actuating means for the double acting valve responsive to positioning of the lever in one operating position to move the valve in one direction and responsive to positioning of the lever in the other position to move the valve in a reverse direction, said actuating means being operative to move the valve from either of its closed end positions to intermediate open position and then from intermediate open position to one or the other of its closed end positions.

4. A control device for pressure-operated gear shifting mechanism in motor vehicles including a double acting valve for controlling the supply of shifting pressure to the shifting mechanism operative in each of its end positions to shut off the shifting pressure and operative in an intermediate open position to supply shifting pressure, an operating lever, actuating means for the double acting valve responsive to a single movement of the operating lever in one direction to move the valve in interrupted stages from one closed end position to intermediate open position and then from interrupted open position to its other closed end position.

5. A control device for pressure-operated gear shifting mechanism in motor vehicles including a double acting valve for controlling the supply of shifting pressure to the shifting mechanism operative in each of its end positions to shut off the shifting pressure and operative in an intermediate open position to supply shifting pressure, an operating lever, actuating means for the double acting valve responsive to movement of the operating lever in opposite directions, said actuating means being responsive to a single movement of the lever in one direction to move the valve in interrupted stages from one closed end position to intermediate open position and from intermediate open position to the second closed end position, said actuating means being responsive to a single movement of the lever in the opposite direction to reversely move the valve in interrupted stages from its second closed end position to intermediate open position and from intermediate open position to its first closed end position.

6. A control device for pressure-operated gear shifting mechanism in motor vehicles including a double acting valve for controlling the supply of shifting pressure to the shifting mechanism operative in each of its end positions to shut off the shifting pressure and operative in an intermediate open position to supply shifting pressure, lever-operated actuating means for moving the double acting valve from either closed end position to intermediate open position and then from intermediate open position to a closed end position, and means operative in the course of movement to delay the valve in its intermediate open position.

7. A control device for pressure-operated gear shifting mechanism in motor vehicles including a double acting valve for controlling the supply of shifting pressure to the shifting mechanism operative in each of its end positions to shut off the shifting pressure and operative in an intermediate open position to supply shifting pressure, lever-operated actuating means for moving the double acting valve from each of its closed end positions to intermediate open position and from intermediate open position to its other closed end position, and means for causing the valve to stop in its intermediate open position before moving on to its other closed end position.

8. A control device for pressure-operated gear shifting mechanism in motor vehicles including a double acting valve for controlling the supply of shifting pressure to the shifting mechanism operative in each of its end positions to shut off the shifting pressure and operative in an intermediate open position to supply shifting pressure, an operating lever, lever-operated actuating means for moving the double acting valve between its closed end positions, and pressure responsive means momentarily operative independently of the operating lever to hold the valve in its intermediate open position after initiation and before completion of the movement of the double acting valve by said lever-operated actuating means.

9. A control device for pressure-operated gear shifting mechanism in motor vehicles including a double acting valve for controlling the supply of shifting pressure to the shifting mechanism operative in each of its end positions to shut off the shifting pressure and operative in an intermediate open position to supply shifting pressure, lever-operated actuating means for moving the double acting valve between its closed end positions, and means responsive to the shifting pressure controlled by said valve operative momentarily to hold the valve in intermediate open position.

10. A control device for pressure-operated gear shifting mechanism in motor vehicles including a double acting valve for controlling the supply of shifting pressure to the shifting mechanism operative in each of its end positions to shut off the shifting pressure and operative in an intermediate open position to supply shifting pressure, an operating lever, actuating means responsive to said lever for moving the double acting valve from one closed end position to the other, and automatic means operating independently of the lever for delaying the valve in its intermediate open position in its course of movement from one end position to the other.

11. A control device for pressure-operated gear shifting mechanism in motor vehicles including a double acting valve for controlling the supply of shifting pressure to the shifting mechanism operative in each of its end positions to shut off the shifting pressure and operative in an intermediate open position to supply shifting pressure, means for moving the double acting valve from one closed end position to intermediate open position, means operating in dependency on the shifting pressure for holding the valve in said open position, and means for moving the valve from open position to one or the other of its closed end positions.

12. A control device for pressure-operated gear shifting mechanism in motor vehicles including a double acting valve for controlling the supply of shifting pressure to the shifting mechanism operative in each of its end positions to shut off the shifting pressure and operative in an intermediate open position to supply shifting pressure, pressure operated actuating means reversably operative to move the double acting valve from each closed end position to the other closed end position, a lever controlling the pressure for operating said actuating means, the actuating means being operative in response to and after a single movement of the lever in one direction to move the valve in interrupted stages from one closed end position to intermediate open position and then from intermediate open position to its second closed end position and being operative upon movement of the lever in the reverse direction to move the valve from the second closed end position back to the first closed end position.

13. A control device for pressure-operated gear shifting mechanism in motor vehicles including a double acting valve for controlling the supply of shifting pressure to the shifting mechanism operative in each of its end positions to shut off the shifting pressure and operative in an intermediate open position to supply shifting pressure, actuating means for the double acting valve comprising a first actuating member for moving the valve from one end position to intermediate open position, a second actuating member for moving the valve from said intermediate open position to its other closed end position and means rendered operative upon the valve reaching open position to operate the second actuating means.

14. A control device for pressure-operated gear shifting mechanism in motor vehicles including a double acting valve for controlling the supply of shifting pressure to the shifting mechanism operative in each of its end positions to shut off the shifting pressure and operative in an intermediate open position to supply shifting pressure, actuating means for the double acting valve comprising a pair of pressure responsive pistons, one piston having a short stroke and being operative to move the valve from one closed end position to a fixed intermediate open position, the other piston having a longer stroke and being operative to move the valve from said intermediate open position to its other closed end position and means rendered operative upon the valve reaching open position to operate the piston having the longer stroke to move the valve to its other closed end position.

15. A control device for pressure-operated gear shifting mechanism in motor vehicles including a double acting valve for controlling the supply of shifting pressure to the shifting mechanism operative in each of its end positions to shut off the shifting pressure and operative in an intermediate open position to supply shifting pressure, actuating means for the double acting valve comprising a pressure-responsive member for moving the valve from one closed end position to an intermediate open position, a second pressure-responsive member actuatable by an initiating pressure to move the valve from intermediate open position to its other closed end position and thereafter being subject to the initiating pressure and caused thereby to hold the valve in its latter closed end position and means rendered operative upon the valve reaching open position to supply initiating pressure to the second pressure responsive member.

16. A control device for pressure-operated gear shifting mechanism in motor vehicles including a double acting valve for controlling the supply of shifting pressure to the shifting mechanism operative in each of its end positions to shut off the shifting pressure and operative in an intermediate open position to supply shifting pressure, actuating means for the double acting valve comprising a first pressure-responsive member and a second pressure-responsive member, said members operating successively, one member to move the valve from one closed end position to intermediate open position and the other member to move the valve from intermediate open position to its other closed end position, and means operating in dependency on the shifting pressure for the shift mechanism to supply operating pressure successively to the respective actuating members.

17. A control device for pressure-operated gear shifting mechanism in motor vehicles including a double acting valve for controlling the supply of shifting pressure to the shifting mechanism operative in each of its end positions to shut off the shifting pressure and operative in an intermediate open position to supply shifting pressure, actuating means for the double acting valve comprising a first pressure-responsive member for moving the valve from one closed end position to intermediate open position, a second pressure-responsive member for moving the valve from intermediate open position to its second closed end position, means for supplying initiating pressure first to one and then to the other of said actuating members, and control means for the second member responsive to operation of the first pressure responsive member providing a delay between the operation of the first and second members.

18. In a control device for pressure-operated gear shifting mechanism in motor vehicles, a double acting valve for controlling the supply of shifting pressure to the shifting mechanism operative in each of its end positions to shut off the shifting pressure and operative in an intermediate open position to supply shifting pressure, actuating means for the double acting valve including pressure-responsive member for moving the valve between one closed end position and intermediate open position, a lever-controlled initiating pressure supply for moving said member, supply means communicating with the double acting valve for supplying shifting pressure to act on said member, and control means for said supply means becoming operative after the valve has been moved to open position by said member through the initiating pressure to deliver shifting pressure to act on said member momentarily to hold the valve in open position.

19. A control device for pressure-operated gear shifting mechanism in motor vehicles including a double acting valve for controlling the supply of shifting pressure to the shifting mechanism operative in each of its end positions to shut off the shifting pressure and operative in an intermediate open position to supply shifting pressure, actuating means for the double acting valve comprising a first pressure responsive member for moving the valve between one closed end position and intermediate open position, a second pressure responsive member for moving the valve between intermediate open position and its second closed end position, a lever-controlled initiating pressure supply for moving both of said members, control means for supplying said initiating pressure to the respective members successively and also operating to cause said initiating pressure to act against the second member to hold the valve in its second closed end position, supply means communicating with the double acting valve for supplying shifting pressure to the first member, control means for said supply means becoming operative when the first member through the initiating pressure has moved the valve to open position to cause shifting pressure to act on the first member momentarily to hold the valve in open position.

20. A control device for pressure-operated gear shifting mechanism in motor vehicles including a double acting valve for controlling the supply of shifting pressure to the shifting mechanism operative in each of its end positions to shut off the shifting pressure and operative in an intermediate open position to supply shifting pressure, actuating means for moving the double acting valve between its closed end positions, and pressure responsive locking means for momentarily holding the valve in its intermediate open position.

21. A control device for pressure-operated gear shifting mechanism in motor vehicles including a double acting valve for controlling the supply of shifting pressure to the shifting mechanism operative in each of its end positions to shut off the shifting pressure and operative in an intermediate open position to supply shifting pressure, actuating means for moving the double acting valve between its closed end positions, locking means for holding the valve in intermediate open position, and pressure means responsive to the shifting pressure controlled by the double acting valve for releasing said locking means.

22. A control device for pressure operated gear shifting mechanism in motor vehicles including a double acting valve means for controlling the shifting pressure supply closed in its opposite end positions, lever means, and automatic motor means for actuating the valve initiated into operation by said lever means and being initially operative to move the valve from one closed end position to open stop position intermediate the opposite end positions and automatically operative thereafter to move the valve from its intermediate stop position to its second closed end position.

23. A control device for pressure operated gear shifting mechanism in motor vehicles including a double acting valve means for controlling the shifting pressure supply closed in its opposite end positions, motor actuating means for the valve operative to move the valve in successive automatically interrupted stages from one closed end position to an intermediate open position and then from said intermediate open position to its other closed end position and control means for the motor actuating means responsive to movement of the valve to open position to effect movement of the valve from open position to its other closed end position.

KARL MAYBACH.
CARL BÖTTNER.
EUGEN GLÜCKER.
GUSTAV MEYER.